United States Patent [19]

Iwanade et al.

[11] 4,412,737
[45] Nov. 1, 1983

[54] POSITION DETECTING DEVICE FOR A ZOOM LENS OF A COPYING MACHINE

[75] Inventors: Hisao Iwanade; Ikuo Negoro, both of Tokyo, Japan

[73] Assignee: Asahi Kogaku Kogyo Kabushiki Kaisha, Tokyo, Japan

[21] Appl. No.: 358,948

[22] Filed: Mar. 17, 1982

[30] Foreign Application Priority Data

Mar. 19, 1981 [JP] Japan ............................ 55-38645[U]

[51] Int. Cl.³ ............................................ G03B 27/52
[52] U.S. Cl. ..................................................... 355/55
[58] Field of Search .................................... 355/55, 56

[56] References Cited

U.S. PATENT DOCUMENTS 3,779,642 12/1973 Ogawa et al. .................... 355/56 X Primary Examiner—Michael L. Gellner
Attorney, Agent, or Firm—Sughrue, Mion, Zinn, Macpeak and Seas

[57] ABSTRACT

A copying machine including a zoom lens is provided with a device for detecting the position of the zoom lens, so that the lens may be correctly positioned at a location corresponding to life or actual size copying. The detector includes a photo-interrupter or the like and a small computer which operates to return the lens to the correct position from any position, but such that the final approach to the correct position is always made from the same direction.

8 Claims, 7 Drawing Figures

POSITION DETECTING DEVICE FOR A ZOOM LENS OF A COPYING MACHINE

BACKGROUND OF THE INVENTION

The invention relates to a device for detecting the position of a zoom lens in the magnification varying device of a copying machine which has a zoom lens and a numerically controlled motor for moving the zoom lens to copy an original in a plurality of sizes, e.g. actual size, or with the size of the original image enlarged or contracted.

In general, a numerically-controlled motor requires a position detecting device to determine the number of pulses to be applied to the motor. This detecting device must satisfy the following requirements:

(1) Since the actual or life size magnification is generally used, the device must be able to direct the magnification position of the zoom lens system where an original is copied in life size, (2) When the copying machine is operated again after the power switch thereof has been turned off, or after the electrical power service has been interrupted, the device must be able to discriminate whether the zoom lens is in the enlargement region or in the contraction region, to thereby return the zoom lens to the actual size magnification position, (3) The device must be manufactured with inexpensive components and be simple in construction, having a simple electric circuit, and (4) The device must be able to position the zoom lens with high accuracy.

SUMMARY OF THE INVENTION

Accordingly, an object of the invention is to provide a device for detecting the position of a zoom lens in a magnification varying device of a copying machine, which satisfies the various above-described requirements.

DETAILED DESCRIPTION OF THE PREFERRED EMBODIMENTS

First, as conducive to a full understanding of the invention, the movements of the zoom lens and the detection of the position of the zoom lens will be described. For convenience in description, let us consider the case where a zoom lens 1 is disposed as one unit between the surface of an original and an image forming plane. In varying the size of the image of the original, the zoom lens 1 is moved in an enlargement direction or in a contraction direction; more specifically, the zoom lens 1 is moved along the optical axis from a actual size magnification position A where the original is copied in actual size to an maximum enlargement position A' where the size of the image is enlarged to the maximum size, or it is moved along the optical axis from the actual size magnification position A to maximum contraction position A" where the size of the image is contracted to the largest extent. In both cases, the distance between the surface of the original and the image forming plane is maintained unchanged to form the magnified image of the original. If, in controlling a magnification varying mechanism for a copying machine with a signal representing whether the zoom lens 1 is in the enlargement region or in the contraction region, a detecting device capable of providing a signal which is "on" when the zoom lens 1 is in the enlargement region and which is "off" when the zoom lens 1 is in the contraction region (or vice versa) is provided, then the position of the zoom lens 1 can be detected. In addition, it can be determined from when the level of the signal is switched from "on" to "off" (or vice versa) when the actual size magnification position is attained.

Figure 1:
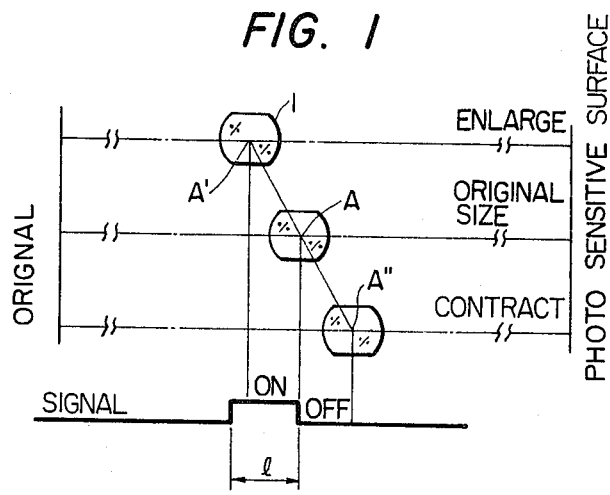
FIG. 1 is an explanatory diagram showing the magnification of a zoom lens, the movements of the zoom lens corresponding to the magnification, and a detection signal.
Figure 2:
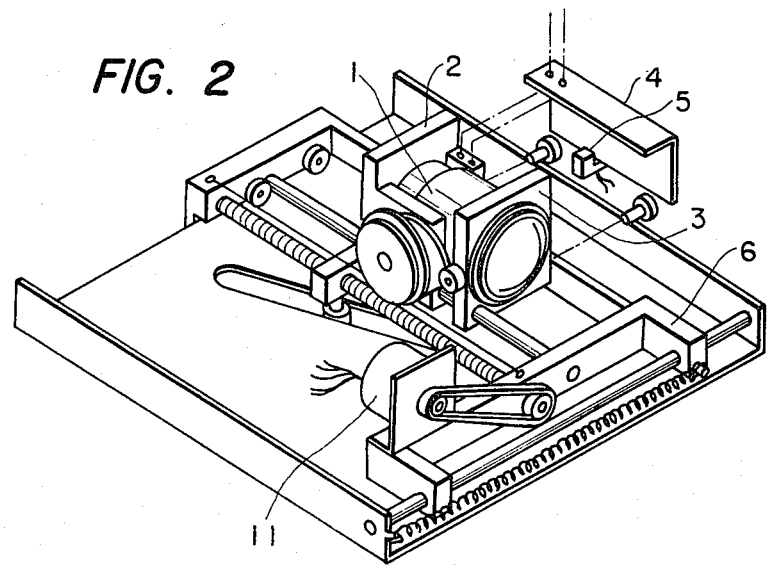
FIG. 2 is a perspective view showing one embodiment of the invention.

FIG. 2 shows one example of a detecting unit of a detecting device which is employed for a magnification varying mechanism having a zoom lens with two movable lens groups. The magnification varying mechanism comprises: a mechanism in which a numerically-controlled motor 11 is operated to move a first holding member 1 and a second holding member 2, which hold a first movable lens group and a second movable lens group respectively, along the optical axis to magnify the size of the image of the original as desired; and a mechanism for moving the optical axis perpendicularly to make the edge of the original align with the edge of an image formed. A unit for detecting the position of the zoom lens 1 comprises a plate-shaped detecting piece 4 provided on the first holding member 2 which holds the first movable lens group and moves the latter along the optical axis as described above; and a detector 5 which is fixedly secured to a base frame 6 so as to detect the presence or absence of the detecting piece 4.

Figure 3:
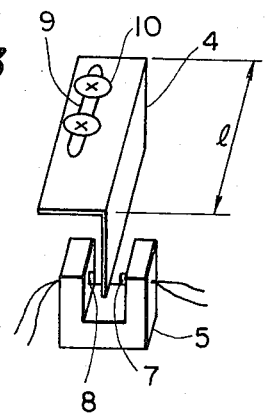
FIG. 3 is an enlarged perspective view of a detecting unit.

FIG. 3 is an enlarged perspective view of the detecting unit. The detector 5 is a conventional photo-interrupter having a light emitting element 7 and a light receiving element 8. The output signal of the detector 5 is turned on and off, respectively, when light from the light emitting element 7 is or is not applied to the light receiving element 8. The detector 5 is positioned so that the detecting piece 4, moving together with the first holding member 2, intercepts light from the light emitting element 7 when the zoom lens 1 is at the actual size magnification position and so that the detector 5 will not collide with the detecting piece 4, which is moved in a scanning direction (i.e., in the direction of the arrow in FIG. 3). The mounting portion of the detecting piece 4 has a hole 9 which is elongated in parallel with the scanning direction. The detecting piece 4 is mounted on the first holding member 2 with screws 10 inserted into the elongated hole 9 in such a manner that the position of the detecting piece 4 is finely adjustable in the scanning direction. The detecting piece 4 has a length l which is long enough to allow the zoom lens 1 to move between the actual size magnification position and the maximum enlargement position, allowing for fine adjustment of the position of the detecting piece 4.

As the detecting mechanism is constructed as described above, it can be detected from the presence or absence of the detecting piece 4 with respect to the detector, i.e., from the "on" and "off" levels of the signal from the detector 5, whether the zoom lens is in the enlargement region, including the actual size magnification position, or in the contraction region; more specifically, detecting can be achieved electrically with a suitable circuit (described hereafter), and the actual size magnification position can be finely adjusted along the optical axis.

The operation of returning the zoom lens to the actual size magnification position when the power switch is turned on will now be described.

Figure 4:
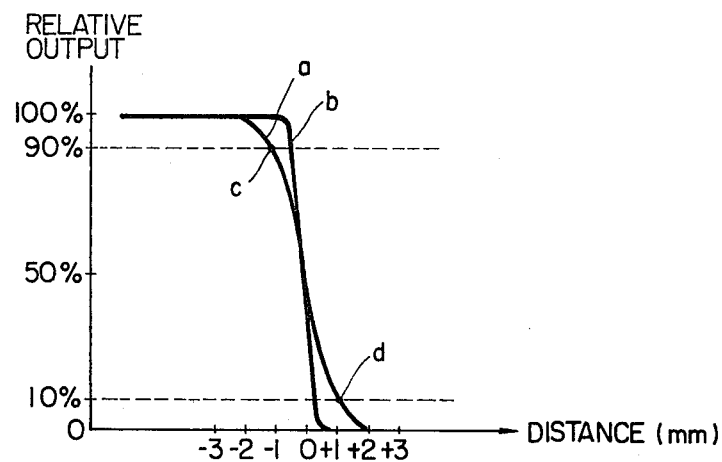
FIG. 4 is a graphical representation showing the characteristic curves of detectors.

FIG. 4 shows general characteristic curves indicating the shift of the output signal of the detector 5 when the detecting piece 4 is moved in the scanning direction; that is, it shows the outputs of the detector 5 with respect to the movement of the detecting piece 4. The characteristic curves in FIG. 4 are obtained by changing the width of a slit disposed before the light receiving element 8. More specifically, the curve a is for a large slit width, and the curve b for a smaller slit width. If detection sensitivity is represented by the distance along the horizontal axis which corresponds to the variation of the relative output from 10% to 90%, then the detection sensitivity with the curve a is less than that with the curve b. Thus, as the slit width is decreased, the detection sensitivity is increased, but the S/N ratio of the detection circuit is decreased. Therefore, it is undesirable, from the point of view of the circuitry involved, to greatly decrease the slit width. As the detection sensitivity is increased, the distance, along the horizontal axis, between the points c and d is decreased. In this connection, it should be noted that light applied to the light receiving element is detected as being intercepted at the point c, and light theretofore intercepted is detected as being applied to the light receiving element at the point d. That is, the signal from the detector 5 is shifted according to the scanning direction of the detecting piece 4. In view of the foregoing, in the invention, a slit of small width is not disposed in front of the light receiving element 8, and the detector (or photo-interrupter) 5 is employed so that the position of the zoom lens is accurately detected from the "on" and "off" signals of the detector. That is, if, in the case where the zoom lens is returned to the actual size magnification position, the detector is operated by moving the detecting piece 4 in only one direction (for instance, the detector 5 is operated only when the light which has been intercepted is now applied to the light receiving element 8), then the detector 5 operates at the point d (FIG. 4) at all times, and accordingly the position detection accuracy is increased. The position where detection of the detecting piece 4 with the detector 5 occurs can be adjusted by finely adjusting the mounting position of the detecting piece 4.

Figure 6:
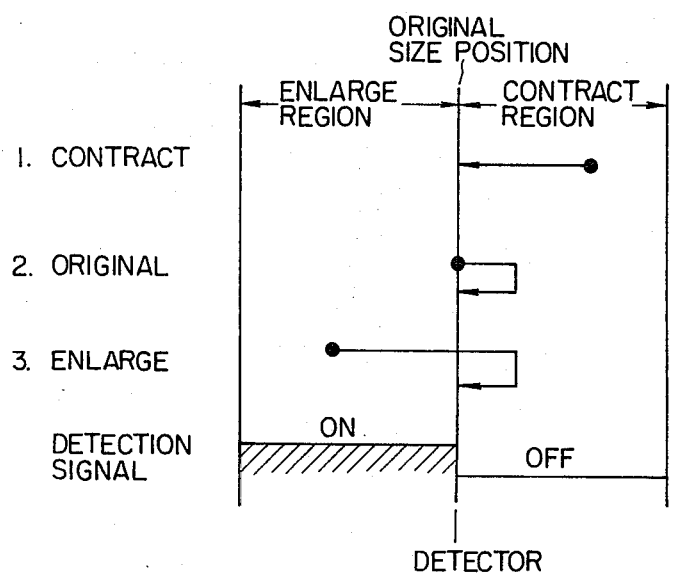
FIG. 6 is an explanatory diagram showing the actual movements of the zoom lens as the latter is returned to the actual size magnification position.
Figure 5:
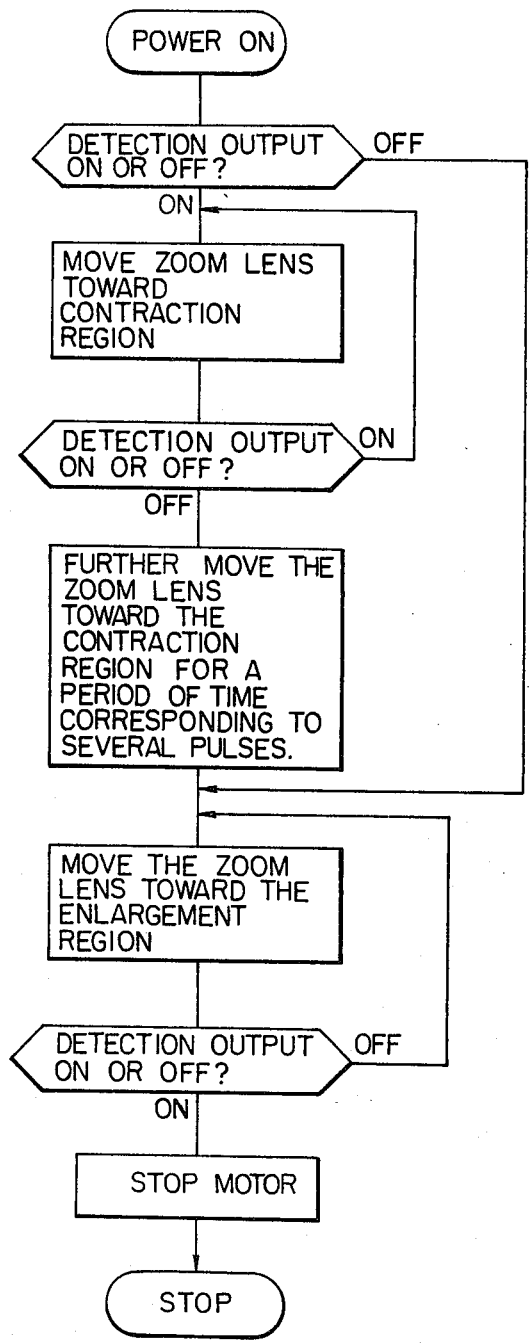
FIG. 5 is a flow chart illustrating the process of returning the zoom lens to the actual size magnification position.

FIG. 5 is a flow chart illustrating the operation of returning the zoom lens to the actual size magnification position. FIG. 6 shows the actual operations of the zoom lens according to the flow chart in FIG. 5.

(1) In the case where the zoom lens is in the contraction region, the zoom lens is moved toward the enlargement region until the detector 5 outputs the "on" signal.

(2) When the zoom lens is at the actual size magnification position, the zoom lens 1 is moved towards the contraction region. After the position detection signal assumes the "off" level, the zoom lens 1 is further moved towards the contraction region for a period of time corresponding to several tens of pulses, and is then moved towards the enlargement region. When the detection signal is raised to the "on" level, the zoom lens is stopped.

(3) In the case where the zoom lens is in the enlargement region, similarly as in the case of the above-described paragraph, the zoom lens is moved towards the contraction region until the signal assumes the "off" level, and is then further moved towards the contraction region for a period of time corresponding to several tens of pulses thereafter. The zoom lens is then returned and stopped when the signal is raised to the "on" level.

Figure 7:
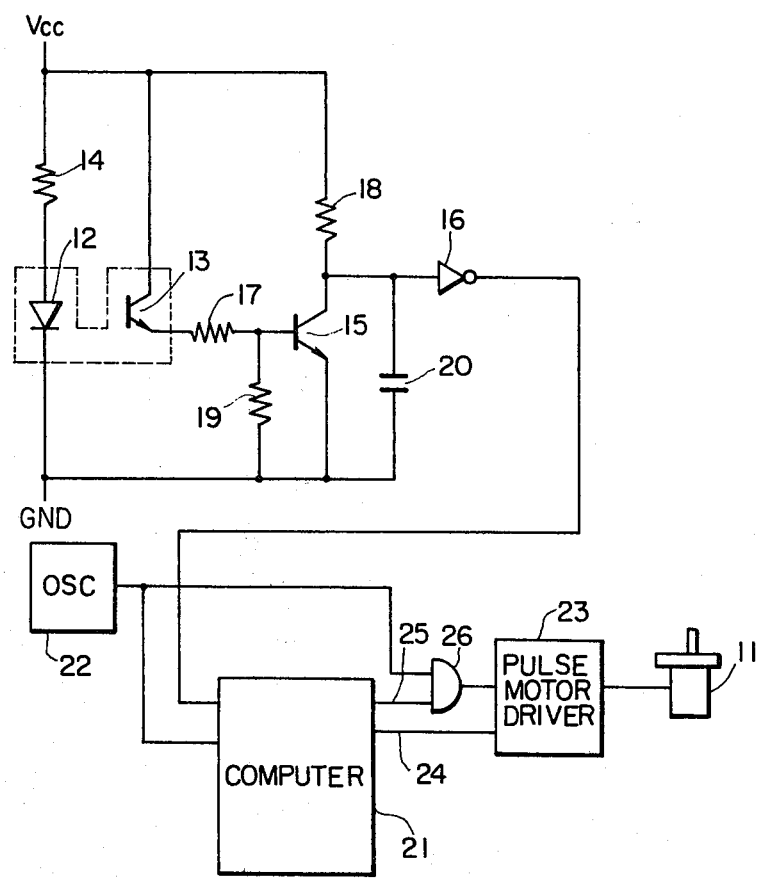
FIG. 7 os a circuit diagram, partly as a block diagram, showing an electric circuit employed in the invention.

FIG. 7 illustrates a circuit for operating the zoom lens as described above. The detector (or photo-interrupter) 5 (encircled by the dotted line) comprises a light emitting diode 12 and a photo-transistor 13. The detector 5 detects when the detecting piece 4 moves through the detector to intercept light from the light emitting diode. A resistor 14 is connected to the light emitting diode 12 to limit current flowing in the diode, to thereby maintian the output of the diode 12 constant. The photo-transistor 13, being paired with the light emitting diode 12, is operated by light from the latter. When the light from the light emitting diode 12 is intercepted by the detecting piece 4, the photo-transistor 13 is set in the cut-off state, and no collector current flows. Accordingly, a transistor 15 in the following stage is placed in the cut-off state, and the collector potential of the transistor 15 is substantially equal to the supply voltage. Therefore, the output of an IC 16 (for instance, model SN7414N made by Texas Instruments) is set to a logic level "0" (or a low logic level). When the light which has been intercepted is applied to the photo-transistor 13, i.e., when the interception condition is switched over to the transmission condition, the photo-transistor 13 becomes active. As a result, the collector current, which is limited by a resistor 17, is applied to the base of the transistor 15 in the following stage to trigger the latter. As a result, the collector current, which is limited by a resistor 18, flows, so that the collector potential approaches the ground level, and therefore the output of the IC 16 is raised to a logic level "1" (or a high logic level). In FIG. 7, a resistor 19 and a capacitor 20 are provided to prevent any possibility of erroneous operation.

The output of the IC 16 and a clock pulse from an oscillator 22 are applied to one-board computer 21, which outputs a rotational direction instruction signal 24 for a pulse motor drive 23, and a gate signal 25 for controlling the clock pulse. A program for controlling the operations according to the flow chart in FIG. 5 has been loaded in the one-board computer 21.

When the power switch is turned on, the computer 21 discriminates the output of the IC 16, to determine the present position of the zoom lens. That is, the computer 21 determines whether the zoom lens should be moved towards the enlargement region (movement to the actual size magnification position) or towards the contraction region (in this mode, the zoom lens is moved towards the contraction region until the output level of the IC 16 is changed (from enlargement to contraction) and the zoom lens is further moved towards the contraction region for a period of time corresponding to several tens of pulses after the output level change, and then the zoom lens is moved towards the enlargement region and is stopped when the edge of the output signal of the IC 16 is detected), to output the rotation direction instruction signal 24. Furthermore, the computer 21 outputs the gate signal 25 during the rear half of the period of the clock pulse. When the gate signal 25 is raised to the "on" level, the clock pulse is applied through the AND gate 26 to the pulse motor driver 23. The pulse motor driver 23 disbrutes the pulse according to the rotational direction instruction signal 24, to rotate the pulse motor 11. The output level of the IC 16 is detected every rear half of the period of the clock pulse at all times, in order to correctly deliver the pulses to the pulse motor driver 23.

In the case where the zoom lens is moved towards the enlargement region, when the edge of the output signal of the IC 16 is detected, the gate signal 25 is set to the "off" level, as a result of which no clock pulse is applied through the AND gate 26 to the pulse motor driver 23 and therefore the pulse motor is stopped. In the case where the zoom lens is further moved towards the contraction region after detection of the edge of the output signal of the IC 16, a counter is formed according to the program so that 1 is added to the count value every clock pulse. When the count value of the counter reaches sixty-four (64), the gate signal 25 is set to the "off" level. Next, in order to move the zoom lens towards the enlargement region, the rotation dirction instruction signal 24 and the gate signal 25 are controlled so that the zoom lens is stopped in response to the edge of the output signal of the IC 16. Thus, the zoom lens has been stopped at the actual size magnification position. The frequency of the clock pulse is equal to a starting pulse rate or lower than the rate.

As is apparent from the above description, according to the invention, the magnification varying device is provided with a plate-shaped detecting piece, and the detector for detecting the position of the zoom lens in the range of movement between the actual size magnification position and the maximum enlargement position (or the maximum contraction position), and the magnification vaying device is simple in construction, being driven by a pulse motor. Therefore, the present position of the zoom lens (in the enlargement region and in the contraction region) can be readily determined by effecting the above-described control. Furthermore, the zoom lens can be stopped at the actual size magnification position with high accuracy by carrying out the control to stop the zoom lens in response to the detection of the edge of the output of the photo-interrupter. Thus, the position of the zoom lens can be accurately controlled by the combination of the inexpensive photo-interrupter and the pulse motor. Thus, when the power switch of the copying machine is turned on, or when electrical power is resupplied to the machine after being out of order, the zoom lens may readily be moved to the actual size magnification position.

What is claimed is:

1. A magnification varying device for a copying machine, comprising a zoom lens having lens groups held by holding members, a numerically-controlled motor for moving said zoom lens to obtain a desired magnification, and a lens position detecting device, said position detecting device including a detecting piece provided on one of said holding members;
   a detector for detecting the presence of said detecting piece;
   said detector detecting a position of said zoom lens when a power switch of said copying machine is turned on; and
   circuit means which, according to a detection signal outputted by said detector, drives said numerically-controlled motor to return said zoom lens to a life-size magnification position.

2. A device as claimed in claim 1, said detecting piece being of a length sufficient to allow said detector to detect the position of said lens in a range of movement thereof between said life-size magnification position and one of a maximum enlargement position and a maximum contraction position.

3. A device as claimed in claim 2, wherein the position of said detecting piece is finely adjustable in the direction of movement of said zoom lens, whereby the life-size magnification posiiton of said zoom lens is finely adjustable.

4. A device as claimed in claims 1 or 2, wherein said detector comprises a single photo-interrupter.

5. A device as claimed in claims 1 or 2, said circuit means operating to drive said motor to move said lens in a manner such that said lens approaches said life-size magnification position to stop thereat from a single direction.

6. A device as claimed in claim 5, said detector comprising a photo-interrupter having a ligh beam interruptible by said deetecting piece, said detecting piece being movable with said lens, said circuit means including means for driving said lens past said life-size magnification position, when said lens approaches said position from one direction, for a predetermined time period after detection of the passage of said detecting piece by said detector, followed by returning said lens from the other direction to stop at said position.

7. A device as claimed in claim 1, said circuit means including logic means operating in response to an output of said detector, computer means receiving an output of said logic means and a clock pulse, and driver means for said motor, said computer means selectively applying a direction instruction signal to said driver means, and a gate signal for allowing the application of pulses to said driver means whereby said motor may be driven according to said pulses and in a direction specified by said instruction signal.

8. A device as claimed in claim 6, wherein said circuit means includes means for driving said lens directly to said life-size magnification position, when said lens initially approaches said position from said other direction.

* * * * *